May 9, 1939.　　　A. R. SWANSON　　　2,157,248
BORING AND THREADING DEVICE
Filed March 26, 1938　　2 Sheets-Sheet 1
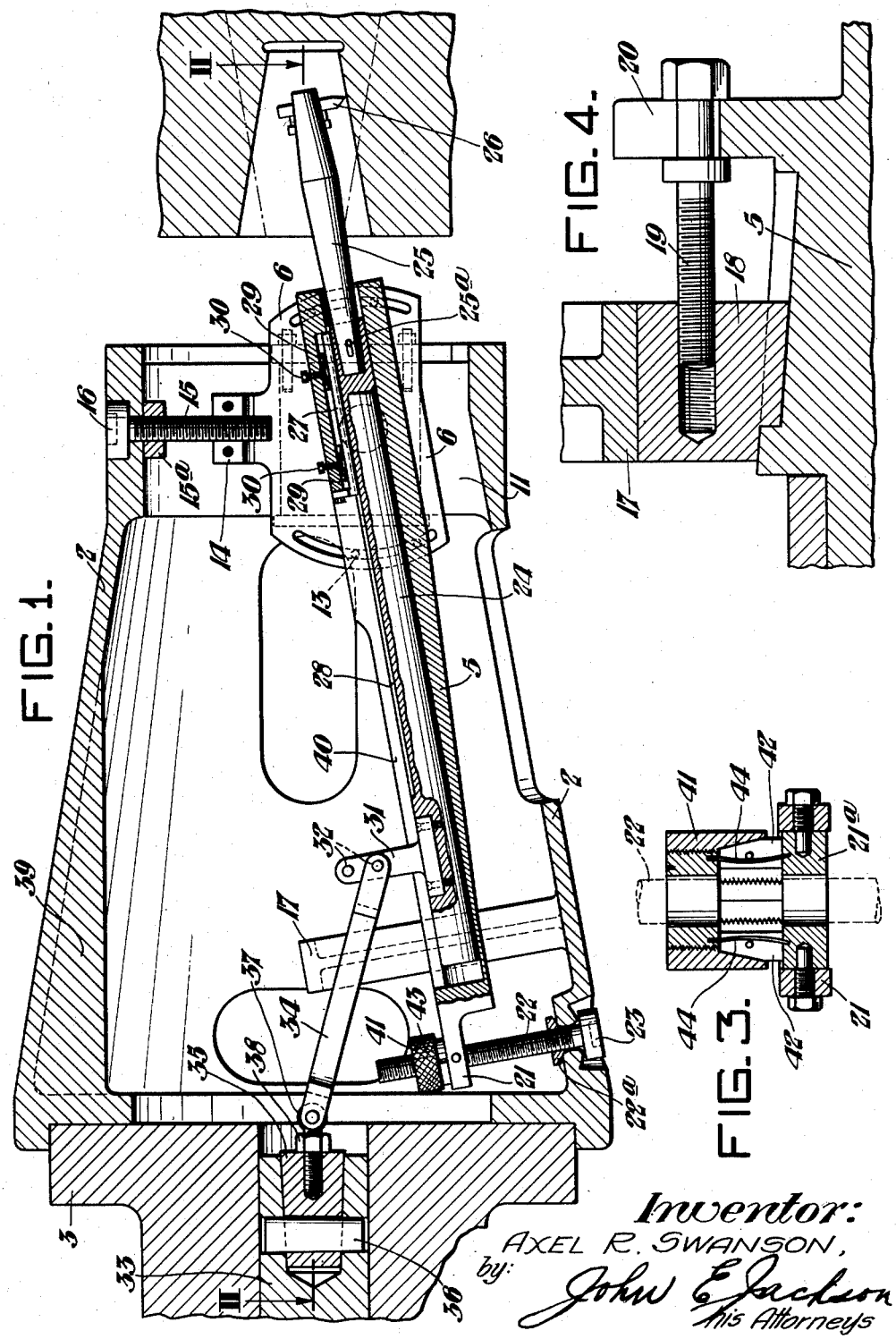
Inventor:
AXEL R. SWANSON,
by: John E. Jackson
His Attorneys May 9, 1939.  A. R. SWANSON  2,157,248
BORING AND THREADING DEVICE
Filed March 26, 1938    2 Sheets-Sheet 2
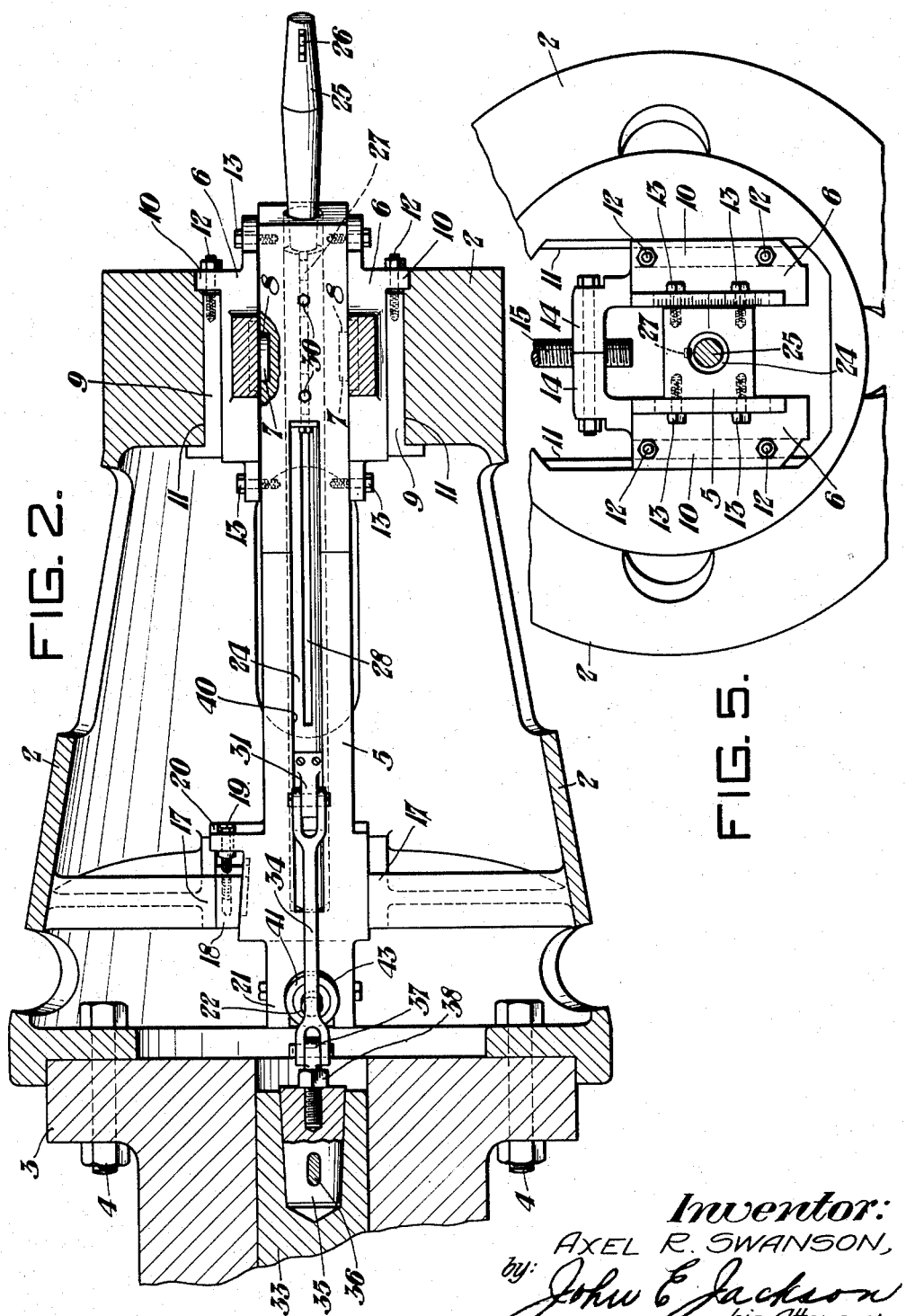
Inventor:
AXEL R. SWANSON,
by: John E Jackson
his Attorneys.

Patented May 9, 1939

2,157,248

UNITED STATES PATENT OFFICE 2,157,248

BORING AND THREADING DEVICE

Axel R. Swanson, Chicago, Ill.

Application March 26, 1938, Serial No. 198,311

9 Claims. (Cl. 82—1)

This invention relates to a boring and threading device, and particularly to an improved adjustable device for use with lathes, boring machines and the like.

It is an object of the present invention to provide an improved boring and threading device or attachment of a simple and inexpensive construction which can be quickly and easily adjusted to cut any desired surfaces.

It is another object of the invention to provide an adjustable device for attachment to the rotatable spindles of a boring machine or the like which will cut a smooth tapered surface.

It is a further object of the invention to provide an adjustable device for attachment to the rotatable spindle of a boring machine or the like which will cut a straight thread or a tapered thread.

It is still another object of the invention to provide a boring and threading device for attachment to a spindle of a boring machine or the like which can be adjusted to cut surfaces at various angles of obliqueness with the axis of the spindle.

Various other objects and advantages of my invention will more fully appear during the course of the following specification, and will be particularly pointed out in the appended claims.

In the accompanying drawings I have shown, for the purpose of illustration, one embodiment which my invention may assume in practice.

In these drawings:

Figure 1 is a longitudinal section of the improved boring and threading device of my invention;

Figure 2 is a section taken on line II—II of Figure 1;

Figure 3 is a longitudinal section of the release nut on the inner adjusting screw;

Figure 4 is a vertical section of the adjustable wedge for locking the inner end of the supporting sleeve in position; and, Figure 5 is an outer end view of the device.

Referring to the drawings, the improved boring and threading device of my invention comprises a truncated conical-shaped housing 2, the large end of which is adapted to be attached to the face-plate 3 of a boring machine, preferably by means of bolts 4. There is mounted within the housing and on one side thereof a sleeve-like bar 5 having its outer end loosely positioned in a movable split hanger 6 which, in turn, is movably mounted in a rectangular guideway 11 in the outer end of the housing. The sleeve is held therein by means of protruding bosses 7 extending from the inner surfaces of the split hanger fitting in recessed holes 8 on the side of the sleeve. On each side of the split hanger 6 there is positioned a flanged plate 9. There is provided on each side of the outer end of the split hanger, flanges 10 having clamping stud-bolts 12 extending therethrough, which fit into tapped holes in the end of the plates 9 which are adapted to lock the split hanger in position relative to the housing. The split hanger and sleeve are adapted to be locked together by means of cap-screws 13 which extend through arcuated slotted holes in flanges of the hanger on each end thereof into the sleeve 5. There is provided on one side of the split hanger 6 an internally threaded extending portion 14 which is adapted to receive the threaded end of an adjusting screw 15, which extends through the opposite side of the housing 2, and a collar 15ᵃ on the inner wall thereof. The head 16 of the adjusting screw 15 is suitably calibrated for purposes hereinafter to be described.

The opposite end of the sleeve 5 is mounted in a guide bracket 17. There is provided to one side of the sleeve and between the sleeve and the bracket 17 a wedge 18 which is adapted to lock this end of the sleeve against movement. The large end of the wedge 18 has a tapped hole therein which is adapted to receive a cap-screw 19 which is mounted in a projecting portion 20 on the side of the sleeve 5. Such an arrangement provides means for forcing the wedge into locking position and withdrawing it therefrom when desired. There is provided on the extreme inner end of the sleeve just beyond the bracket 17 a slotted extension 21 having a swivel connection 21ᵃ mounted therein which is adapted to receive an adjusting screw 22 extending through the side of the housing 2 and having a beveled collar 22ᵃ mounted thereon and positioned next to the inner wall of the housing. The screw 22 has a calibrated head 23 similar to the calibrated head of the adjusting screw 15, the purpose of which also will be described later in the specification.

There is positioned on the end of the threaded screw 22, next to the swivel connection 21ᵃ of the sleeve, a release nut 41 which comprises, as shown in Figure 3, three threaded jaws 42 having tapered upper ends which extend into the inner lower tapered end of a knurled thumb-nut 43. There is also arranged a leaf-spring 44 against each of the jaws so that when the thumb-nut 43 is turned in the releasing direction, the springs will force the jaws 42 outwardly, disengaging the threaded portions of the jaws from the screw 22 and allowing that end of the sleeve 6 to be freely moved for the purpose of adjustment.

There is mounted in the sleeve 5 and extending longitudinally thereof a tool holding or supporting bar 24, the outer end of which has an opening therein which is adapted to receive a conventional tool holder 25 which is held therein preferably by means of a key 25ª, and which carries a suitable cutting tool 26. There is provided on the inner wall of the sleeve, preferably in the vicinity of the split hanger, a key 27 which is adapted to cooperate with a longitudinally extending keyway 28 in the tool supporting bar 24. There is provided, between the key 27 and the inner wall of the sleeve, a pair of springs 29 which are adapted to yieldably hold the key in position in the keyway 28 by means of adjustable machine screws 30 bearing thereon. This arrangement keeps the tool supporting bar from turning in the sleeve and provides an adjustment to compensate for wear. The supporting bar 24 at its inner end carries an arm 31 which extends towards the center of the housing through a longitudinally extending slot 40 in the sleeve 5, and has a pair of holes 32 therein. The arm 31 of the tool supporting bar is connected to the longitudinal movable feed rotatable spindle 33 of a suitable machine, preferably a conventional horizontal boring machine, by means of a forked link 34. There is provided in the outer end of an actuating spindle mounted for longitudinal movement within the rotatable spindle 33 a tapered plug 35 which is held in position therein preferably by means of a suitable key 36. The end of the plug 35 has a tapped hole therein which is adapted to receive an eye-bolt 37 having a lock-nut 38 thereon. This eye-bolt 37 is adapted to receive the inner end of the forked link 34.

It will be seen that this entire mechanism is adapted to lie on one side of the housing and it is preferable that a counter-weight 39 be provided on the opposite side of the housing so as to balance the device when it is in motion.

Preferably the outer end face of the split hanger is calibrated in degrees, as shown in Figure 5, the zero point being at the point where the center line of the boring-bar is positioned when the tool holder bar is in a position parallel to the axis of the machine spindle. The sleeve 5 has a line positioned on its face adjacent the face of the split hanger on which the degree calibrations are marked so that when the tool holder bar is parallel to the center line of the machine spindle the line on the sleeve 5 will be positioned at the zero mark on the split hanger.

After the device has been properly assembled on the machine with which it is to be used, it is adjusted for cutting the desired surface as follows:

The release nut 41 at the rear end of the sleeve 5 is loosened, and the cap-screw 19 turned so as to withdraw the locking wedge 18 from between the bracket 17 and the sleeve 5, allowing this end of the sleeve to move freely. The cap-screws 13 are then loosened so that the front end of the sleeve may be freely moved in the split hanger 6. The sleeve 5 is then set at the desired angle by aligning the mark on the end of the sleeve with the degree calibrations on the end of the split hanger. The release nut 41 is then repositioned and locked on the screw 22 at the rear end of the sleeve 5 and small adjustments can be made by means of the screws 22 and 15. The cap-screws 13 are then tightened to lock the front end of the sleeve in the hanger in the adjusted position. The cap-screw 19 is then turned so as to force the wedge 18 between the bracket 17 and the sleeve 5 to securely lock the rear end of the sleeve 5 in position. The tool holder 25 carrying the cutting tool 26 is then fed into the work by the thrust of the machine spindle which is actuated by the longitudinal movement of the actuating means positioned within the spindle 33 through the through-bar 34 and the tool supporting bar 24. The machine is then set in operation revolving the entire device. After a cut has been made of the desired length on the work, the tool is backed out and moved over a small amount by means of the screws 15 and 22 so that another cut can be made as the tool again is moved into the work by the forward motion of the machine spindle 33. This is repeated until the desired surface is completely cut.

It will be understood that with the use of this device either an internal or external surface or thread may be cut. Also, it will be seen that in order to cut a tapered surface opposite that shown by the full lines of Figure 1 and shown by the broken lines therein, it is only necessary to reverse the cutting tool in the tool holder.

While I have shown and described an embodiment of my invention, it will be understood that this embodiment is merely for the purpose of illustration and description and that various other forms may be devised within the scope of my invention, as defined in the appended claims.

I claim:

1. A device of the class described comprising a housing, means for attaching said housing to a rotatable spindle of a machine, a cutting tool, means carried by said housing for supporting said tool, and means independent of said housing connecting said tool supporting means to actuating means positioned within said spindle, whereby said tool supporting means may be adjusted laterally and said means positioned within said spindle is adapted to impart a longitudinal feeding movement thereto.

2. A device of the class described comprising a housing, means for attaching said housing to the rotatable spindle of a machine, a cutting tool, means carried by said housing for supporting said tool, a sleeve for supporting said tool supporting means, means independent of said housing connecting said tool supporting means, actuating means positioned within said spindle whereby said tool supporting means is adapted to be moved longitudinally relative to said sleeve and said housing, and means for adjusting said sleeve laterally whereby said tool is adapted to cut at various angles of obliqueness with the axis of said spindle.

3. A device of the class described comprising a housing, means for attaching said housing to the rotatable spindle of a machine, a cutting tool, longitudinally extending movable means carried by said housing for supporting said tool, means for imparting a longitudinal movement to said tool supporting means, whereby said tool is adapted to be fed forwardly, and means for adjusting said tool supporting means laterally to various angles of obliqueness with the axis of said spindle.

4. A device of the class described comprising a housing, means for attaching said housing to a rotatable spindle of a machine, a cutting tool, means carried by said housing for supporting said tool, and means independent of said housing connecting said tool supporting means to the actuating means positioned within said rotatable spindle of said machine whereby said actuating means is adapted to move said tool supporting means longitudinally so that the tool carried thereby will cut surfaces at various angles of obliqueness with the axis of said spindle.

5. A device of the class described comprising a sleeve-like member, means adapted to be attached to the rotatable spindle of a machine for supporting said sleeve-like member, means for adjusting said sleeve-like member laterally of said supporting means, a tool holder supporting member arranged within said sleeve for longitudinal movement therein, means for connecting the inner end of said tool holder supporting member to an actuating means arranged within said spindle whereby said tool holder supporting member is adapted to be moved longitudinally relative to said sleeve, and means arranged in the outer end of said tool holder supporting member for receiving a tool holder whereby said tool carried thereby is adapted to cut at various angles of obliqueness with the axis of said spindles.

6. A device of the class described comprising a longitudinally extending tool holder supporting member, means adapted to be attached to the rotatable spindle of a machine for supporting said tool holder supporting member, a member arranged for lateral adjustment on the outer end of said supporting means to which the outer end of said tool holder supporting member is pivotally attached, means for adjustably supporting the inner end of said tool holder supporting member, means for connecting the inner end of said tool holder supporting member to a tool holder supporting member actuating means arranged within said spindle whereby said tool holder supporting member is adapted to be moved longitudinally, and means arranged in the outer end of said tool holder supporting member for receiving a tool holder whereby said tool carried thereby is adapted to cut at various angles of obliqueness with the axis of said spindle.

7. A device of the class described comprising a housing, means for attaching said housing to the rotatable spindle of a machine, a longitudinally extending member arranged within said housing, a member arranged for lateral adjustment in the outer end of said housing to which the outer end of said longitudinally extending member is pivotally attached, means for adjustably supporting the inner end of said longitudinally extending member, a tool holder supporting member associated with said longitudinally extending member for longitudinal movement relative thereto, means for connecting the inner end of said tool holder supporting member to an actuating means arranged within said spindle whereby said tool holder supporting member is adapted to be moved longitudinally, and means arranged in the outer end of said tool holder supporting member for receiving a tool holder whereby said tool carried thereby is adapted to cut at various angles of obliqueness with the axis of said spindle.

8. A device of the class described comprising a housing, means for attaching one end of said housing to the rotatable spindle of a machine, a longitudinally extending sleeve member movable mounted within said housing for adjusting the position of said sleeve laterally of said housing, a tool holder supporting member arranged within said sleeve for longitudinal movement therein, a link for connecting the inner end of said tool holder supporting member to an actuating means arranged within said spindle whereby said tool holder supporting member is adapted to be moved longitudinally relative to said sleeve and said housing, and means arranged in the outer end of said tool holder supporting member for receiving a tool holder whereby said tool carried thereby is adapted to cut at various angles of obliqueness with the axis of said spindles.

9. A device of the class described comprising a housing, means for attaching said housing to the rotatable spindle of a machine, a longitudinally extending sleeve-like member movably mounted in said housing, a hangar arranged for lateral adjustment in the outer end of said housing to which the outer end of said sleeve-like member is pivotally attached, means for adjustably supporting the inner end of said sleeve-like member, a tool holder supporting member, movably arranged within said sleeve-like member, a link member for connecting the inner end of said tool holder supporting member to an actuating means arranged within said spindle whereby said tool holder supporting member is adapted to be moved longitudinally relative to said sleeve-like member, and means arranged in the outer end of said tool holder supporting member for receiving a tool holder whereby said tool carried thereby is adapted to cut at various angles of obliqueness with the axis of said spindle.

AXEL R. SWANSON.